United States Patent Office 2,900,355
Patented Aug. 18, 1959

2,900,355

COMPOSITION CONTAINING POLY-1,1-DIHYDROXYPERFLUOROBUTYL ACRYLATE, SILICON DIOXIDE, CARBON BLACK AND CURING AGENT

Louis E. Novy, Columbus, Ohio, assignor to the United States of America as represented by the Secretary of the Air Force No Drawing. Application November 12, 1957
Serial No. 695,995

5 Claims. (Cl. 260—28.5)

This invention relates to polymeric compositions, and is more particularly concerned with an improved group of polyfluorobutyl acrylate polymer compositions.

Because of increased speeds and greater power requirements in newly developed aircraft, it has become necessary to increase the operating temperatures in aircraft lubricating and hydraulic systems. With such temperature increases, the presently used fluids were found to be unsatisfactory, and it was deemed necessary to employ ester-type lubricants and ester-type hydraulic fluids. Although such a change solved the problem presented, it also created a new problem. The esters in combination with the elevated temperatures were found to be very harmful to rubber component parts such as hoses, gaskets and the like. Accordingly, it was necessary to develop an improved rubber which could withstand the deleterious action of the esters for at least 500 hours at temperatures of at least 350° F.

Therefore, it is an object of this invention to provide an improved rubber composition.

More specifically, an object of the invention is to provide a polymeric composition which exhibits increased resistance to the destructive action of ester-type fluids and high temperatures.

In solving the problem presented, the base polymer employed was poly-1.1-dihydroperfluorobutyl acrylate produced under the trade name Poly-FBA by the Minnesota Mining and Manufacturing Company. Although the specific examples hereinafter set forth all employ Poly-FBA, it should be understood the other and different acrylate polymers may also be employed.

Tests were run on Poly-FBA compositions wherein various fillers were used. While furnace black-filled polyfluorobutyl acrylate compositions generally display a poorer retention of physical properties upon hot-oil aging than silicon dioxide-filled compositions, the black-filled compositions usually have higher elongation, both before and after aging.

As a consequence of these facts, a series of polymeric compositions were prepared using both of the above-named fillers. Various quantities of each filler were used. The resulting compounds were milled and cured using standard procedures well known to those skilled in the art. A suitable cure for those set forth in the examples was obtained at a temperature of 310° F. for 60 minutes. A relatively substantial amount of curing ingredients such as sulfur and triethylene tetramine were found necessary to produce the optimum physical properties in the final product. After curing, test specimens were prepared and subjected to hot-oil aging to determine the usability of the compositions.

The test results in the following table indicate not only the properties of those compositions which comprise the invention, but also include examples of results obtained using one or the other of the fillers above. The specific ingredients used and the quantities of each are: Poly-FBA, 100 parts by weight; paraffin, 1 part by weight; Cab-O-Sil, as shown in table; Philblack O, as shown in table; sulfur, 1 part by weight; triethylene tetramine, as shown in table. Cab-O-Sil is silicon dioxide, a product of Godfrey L. Cabot, Inc., and Philblack O is a high abrasion furnace carbon black, a product of Phillips Chemical Co. The paraffin employed is in the form of a soft, hydrocarbon wax and is a product of Shell Chemical Company.

| Ingredients | | | Original Properties | | | After Aging 500 Hrs. at 350° F. | | | | | After Aging 500 Hrs. at 400° F. | | | | |
| --- | --- | --- | --- | --- | --- | --- | --- | --- | --- | --- | --- | --- | --- | --- | --- |
| Cab-O-Sil | Phil-black O | TETA | Tensile Strength p.s.i. | Elongation Percent | Hardness Shore A | Tensile Strength, p.s.i. | Elongation, Percent | Hardness, Shore A | Swell, Percent | Cracking | Tensile Strength, p.s.i. | Elongation, Percent | Hardness, Shore A | Swell, Percent | Cracking |
| 15 | -------- | 1.2 | 820 | 330 | 45 | 430 | 250 | 54 | 9.9 | No | -------- | -------- | -------- | -------- | -------- |
| -------- | 35 | 1.0 | 960 | 150 | 63 | 590 | 120 | 65 | 6.2 | No | -------- | -------- | -------- | -------- | -------- |
| 15 | 10 | 1.4 | 1,230 | 390 | 57 | 640 | 300 | 60 | 5.5 | No | 290 | 60 | 72 | 3.8 | No |
| 10 | 20 | 1.4 | 1,340 | 280 | 60 | 700 | 180 | 67 | 5.7 | No | 350 | 70 | 73 | 3.8 | No |

These results were obtained by using an aging procedure which consisted of suspending samples of the test specimens in test tubes. A synthetic diester oil was added, and the tubes were placed in an aluminum-block heater for the desired time interval. At the end of a given aging period, the tubes were removed from the aluminum block and allowed to cool for one hour. The samples were then taken from the oil, dipped quickly in acetone to remove any oil adhering to the surface, and blotted dry before tests were run. The stress-strain properties were determined with a Dillon Low-Range Tester used at a speed of 20 inches per minute, and hardness was observed on a Shore A-2 Durometer. Swelling was determined with a Klaus-Jolly balance. The percent swelling was calculated by comparing relative volumes before and after aging. The cracking was checked by visual observation with specimens flexed 180 degrees.

The tabulated results of these tests make clear the superior over-all performance of the compositions of the invention. At 350° F., their tensile strength is considerably greater while the percentage of swelling is materially reduced. The elongation of the inventive compositions also compares favorably with those compositions using only a single filler, and finally the hardness is well within the acceptable range. After hot-oil aging at 400° F., there is such a complete degradation of the single filler compositions that figures are not included. With both fillers used together, it will be noted that the physical properties of the compositions are still good, and no cracking is evident. Although specific data has been included for only two examples, it should be pointed out that other compositions may be prepared using fillers in proportions intermediate to those set forth herein.

From all of the foregoing it will be clear that my invention provides a rubber composition having heretofore unavailable resistance to degradation when exposed to lubricants at elevated temperatures. It is to be understood that the above described principle may be applied

What is claimed is:

1. A polymeric rubber composition consisting essentially of 100 parts by weight of poly-1,1-dihydroperfluorobutyl acrylate, from 10 to 15 parts by weight of silicon dioxide, from 10 to 20 parts by weight of carbon black, and 1.4 parts by weight of triethylene tetramine.

2. A polymeric rubber composition as defined in claim 1, further including 1 part by weight of paraffin wax and sulfur.

3. A polymeric rubber composition consisting essentially of 100 parts by weight of poly-1,1-dihydroperfluorobutyl acrylate, 1 part by weight of paraffin wax, 15 parts by weight of silicon dioxide and 10 parts by weight of carbon black as fillers, and 1 part by weight of sulfur and 1.4 parts by weight of triethylene tetramine as curatives.

4. A polymeric rubber composition consisting essentially of 100 parts by weight of poly-1,1-dihydroperfluorobutyl acrylate, from 10 to 15 parts by weight of silicon dioxide, from 10 to 20 parts by weight of carbon black, and curing agents for the polymeric acrylate consisting of sulfur and triethylene tetramine, said agents comprising 2.4 parts by weight of said composition.

5. A polymeric rubber composition consisting essentially of 100 parts by weight of poly-1,1-dihydroperfluorobutyl acrylate, 1 part by weight of paraffin wax, 10 parts by weight of silicon dioxide and 20 parts by weight of carbon black as fillers, and 1 part by weight of sulfur and 1.4 parts by weight of triethylene tetramine as curatives.

References Cited in the file of this patent
UNITED STATES PATENTS 2,209,928   Nowak et al. _____ July 30, 1940